(12) United States Patent
Lee et al.

(10) Patent No.: US 11,370,647 B2
(45) Date of Patent: Jun. 28, 2022

(54) WATER DISCHARGE DEVICE

(71) Applicant: COWAY CO., LTD., Chungcheongnam-do (KR)

(72) Inventors: Jong-Hwan Lee, Seoul (KR); Chan-Jung Park, Seoul (KR); Woong Jung, Seoul (KR); Hyun-Goo Kim, Seoul (KR)

(73) Assignee: Coway Co., Ltd

(*) Notice: Subject to any disclaimer, the term of this patent is extended or adjusted under 35 U.S.C. 154(b) by 265 days.

(21) Appl. No.: 16/607,288

(22) PCT Filed: Apr. 17, 2018

(86) PCT No.: PCT/KR2018/004437
§ 371 (c)(1),
(2) Date: Oct. 22, 2019

(87) PCT Pub. No.: WO2018/199533
PCT Pub. Date: Nov. 1, 2018

(65) Prior Publication Data
US 2020/0384390 A1      Dec. 10, 2020

(30) Foreign Application Priority Data
Apr. 24, 2017  (KR) .................. 10-2017-0052238

(51) Int. Cl.
*B67D 1/00*       (2006.01)
*B01D 35/04*      (2006.01)

(52) U.S. Cl.
CPC ........... *B67D 1/0003* (2013.01); *B01D 35/04* (2013.01); *B67D 2210/00049* (2013.01); *B67D 2210/00065* (2013.01); *B67D 2210/00094* (2013.01)

(58) Field of Classification Search
CPC ................ B67D 1/0004; B67D 1/0003; B67D 2210/00049; E03C 2001/0414;
(Continued)

(56) References Cited

U.S. PATENT DOCUMENTS 2,240,392 A * 4/1941 Dowell ................. B05B 15/652
                                                          239/525
3,666,179 A * 5/1972 Peschcke-Koedt ....... E03C 1/06
                                                          239/282

(Continued)

FOREIGN PATENT DOCUMENTS

ER     1 833 339      9/2007
GB       438817      11/1935
(Continued)

OTHER PUBLICATIONS

English translation of Jung (KR 20160031671 A) (Year: 2016).*
(Continued)

*Primary Examiner* — Andrew D St.Clair
(74) *Attorney, Agent, or Firm* — The Farrell Law Firm, P.C.

(57) ABSTRACT

A water discharge device is disclosed. A water discharge device according to an embodiment of the present invention may comprise: a main body unit including a first main body and a second main body movably connected to the first main body; and a discharge unit connected to the second main body so as to be moved with the second main body, and connected to a water source so as to discharge water in the water source to the outside, wherein the discharge unit comprises a plurality of link members having flow channels through which water flows, respectively, and rotatably connected to each other so as to connect the flow channels in a sealed manner.

12 Claims, 8 Drawing Sheets

(58) Field of Classification Search
CPC ........... E03C 1/0404; E03C 2001/0417; B01D 35/04; A47J 31/40; A47J 31/402; A47J 31/057
See application file for complete search history.

(56) References Cited

U.S. PATENT DOCUMENTS

| | | | | |
|---|---|---|---|---|
| 3,726,318 | A * | 4/1973 | Hyde | F16K 19/00 137/625.41 |
| 4,437,497 | A * | 3/1984 | Enander | B65B 3/26 137/386 |
| 7,654,192 | B2 * | 2/2010 | Oehninger | A47J 31/4482 99/280 |
| 2006/0108023 | A1 * | 5/2006 | Greiwe | A47J 31/4482 141/369 |
| 2007/0031558 | A1 * | 2/2007 | Lussi | A47J 31/4482 426/520 |
| 2009/0301310 | A1 | 12/2009 | Bazin et al. | |
| 2014/0015246 | A1 * | 1/2014 | Erickson | E03C 1/04 285/184 |
| 2014/0318381 | A1 * | 10/2014 | Talon | A47J 31/407 99/295 |
| 2016/0000258 | A1 * | 1/2016 | De'Longhi | A47J 31/4485 99/323.1 |

FOREIGN PATENT DOCUMENTS

| | | | |
|---|---|---|---|
| JP | 2000266199 | | 9/2000 |
| KR | 1020110016084 | | 2/2011 |
| KR | 1020110031672 | | 3/2011 |
| KR | 1020120070286 | | 6/2012 |
| KR | 1020140032107 | | 3/2014 |
| KR | 20160031671 A * | | 3/2016 |
| WO | WO 2006/067313 | | 6/2006 |

OTHER PUBLICATIONS

European Search Report dated Mar. 17, 2020 issued in counterpart application No. 18791239.9-1016, 6 pages.
PCT/ISA/210 Search Report issued on PCT/KR2018/004437 pp. 5.
PCT/ISA/237 Written Opinion issued on PCT/KR2018/004437 pp. 7.

* cited by examiner

WATER DISCHARGE DEVICE

PRIORITY

This application is a National Phase Entry of International Application No. PCT/KR2018/004437, which was filed on Apr. 17, 2018, and claims priority to Korean Patent Application No. 10-2017-0052238, which was filed on Apr. 24, 2017, the content of each of which is incorporated herein by reference.

TECHNICAL FIELD

The present disclosure relates to a water discharge device discharging water from a water supply source externally.

BACKGROUND ART

A water discharge device is connected to a water supply source, and discharges water from the water supply source externally to supply water to a user. A water discharge device may be connected to a water treatment device such as a water purifier, or the like, and may discharge filtered water, such as water filtered in a water treatment device, externally, and may supply the water to a user.

A water discharge device may be moveably provided in a water supply source such as a water treatment device. Accordingly, a user may be supplied with water from a water supply source through a water discharge device while appropriately adjusting a height of the water discharge device to a height desired by the user or in accordance with an intended purpose.

Generally, when a water discharge device is movably provided in a water supply source such as a water treatment device, or the like, the water discharge device may be connected to the water supply source such as a water treatment device, or the like, through a flexible tube to allow the water discharge device to move smoothly.

The above-described configuration, however, may occupy a relatively large space as a space in which the flexible tube is disposed may be required. Also, as a flexible tube is curved, foreign objects may remain in a curved portion of the flexible tube such that a user may be supplied with water including foreign objects. Further, when a flexible tube is used for a long time, the flexible tube may be deformed or broken such that water from a water supply source may not be smoothly discharged through a water discharge device.

DISCLOSURE

Technical Problem

An aspect of the present disclosure is to address at least one of the above demands or issues occurring in the related art.

An aspect of the present disclosure is to provide a water discharge device which may move and may discharge water from a water supply source externally without using a flexible tube.

Another aspect of the present disclosure is to provide a water discharge device which may move in a relatively small space.

Another aspect of the present disclosure is to provide a water discharge device which may have improved sanitation to supply water without foreign objects to a user.

Another aspect of the present disclosure is to provide a water discharge device which may smoothly discharge water from a water supply source.

Technical Solution

According to an aspect of the present disclosure, a water discharge device according to an example embodiment includes features as outlined below.

According to an aspect of the present disclosure, a water discharge device includes a body unit including a first body and a second body moveably connected to the first body; and a discharge unit connected to the second body, moving along with the second body, and connected to a water supply source to discharge water from the water supply source externally, and the discharge unit includes a plurality of link members having flow channels through which water flows, respectively, and rotatably connected to one another to connect the flow channels to one another in a sealed manner.

In this case, the discharge unit may further include a supply source connection member having the flow channel and connected to the water supply source, and a link member of the plurality of link members disposed on one side is rotatably connected to the supply source connection member.

Also, each of the supply source connection member and partial link members of the plurality of link members may include a first rotary connection portion, each of partial link members of the plurality of link members may include a second rotary connection portion rotatably connected to the first rotary connection portion, and the flow channel may be configured to extend to the first rotary connection portion and the second rotary connection portion.

The second rotary connection portion may be inserted into and rotatably connected to the first rotary connection portion.

The second rotary connection portion may include a sealing member for sealing a region between the first rotary connection portion and the second rotary connection portion.

The plurality of link members may include a first link member rotatably connected to the supply source connection member, a second link member rotatably connected to the first link member, and a third link member rotatably connected to the second link member.

Each of the supply source connection member, the first link member, and the third link member may include the first rotary connection portion, and each of the first link member and the second link member may include the second rotary connection portion.

The water discharge device may further include a discharge member connected to a link member of the plurality of link members disposed on the other side and to the second body, and including a discharge channel connected to the flow channel of the link member disposed on the other side and to an external entity.

The first body may include a member through hole, and the second body may include a moving guide member configured to penetrate the member through hole.

The second body may include a moving guide hole, and a portion of the first body disposed on a side of the member through hole may pass through the moving guide hole and may be disposed in the second body.

The discharge unit may penetrate through the moving guide hole and a body through hole formed in the first body, and may be connected to the water supply source.

The second body may include an insertion connection hole to which a portion of the discharge member is inserted and connected such that the portion of the discharge member may be externally exposed.

Advantageous Effects

As set forth above, according to an example embodiment in the present disclosure, a water discharge device may be able to move and may discharge water from a water supply source externally using a plurality of link members, rather than using a flexible tube.

Also, according to an example embodiment in the present disclosure, the water discharge device may be able to move in a relatively small space.

Further, according to an example embodiment in the present disclosure, hygiene of the water discharge device may improve such that water may be supplied to a user without foreign objects.

Also, according to an example embodiment in the present disclosure, water from a water supply source may be smoothly discharged through the water discharge device.

BEST MODE FOR INVENTION

Figure 1:
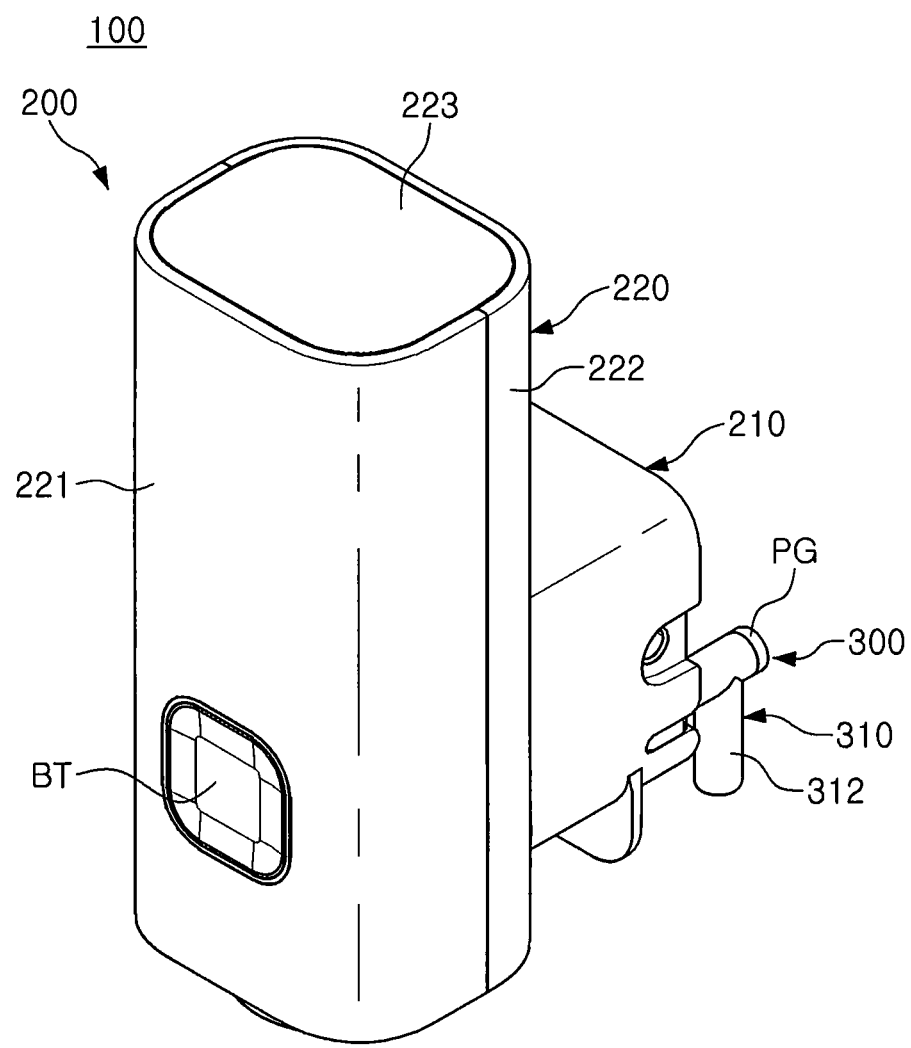
FIG. 1 is a perspective diagram illustrating a front side of a water discharge device according to an example embodiment in the present disclosure.

To help understanding of features of the present invention as above, example embodiments of a water discharge device will be described in greater detail.

In the descriptions below, the present disclosure will be described based on the most appropriate example embodiments for an understanding of technical features in the present disclosure. It is to be understood that the technical features of the present invention are not limited to the example embodiments, and the present invention may be implemented as in the example embodiments described herein. Thus, the present invention may be modified in various manners through the example embodiments described herein within the technical scope of the present invention, and the modified example embodiments are to be included in the technical scope of the present invention. Also, to help in an understanding of the example embodiments, as for reference numerals in the attached drawings, relevant elements among elements having the same function in the example embodiments are indicated by the same or similar forms of reference numeral.

In the descriptions below, an example embodiment of a water discharge device according to the present disclosure will be described with reference to FIGS. 1 to 8.

Figure 2:
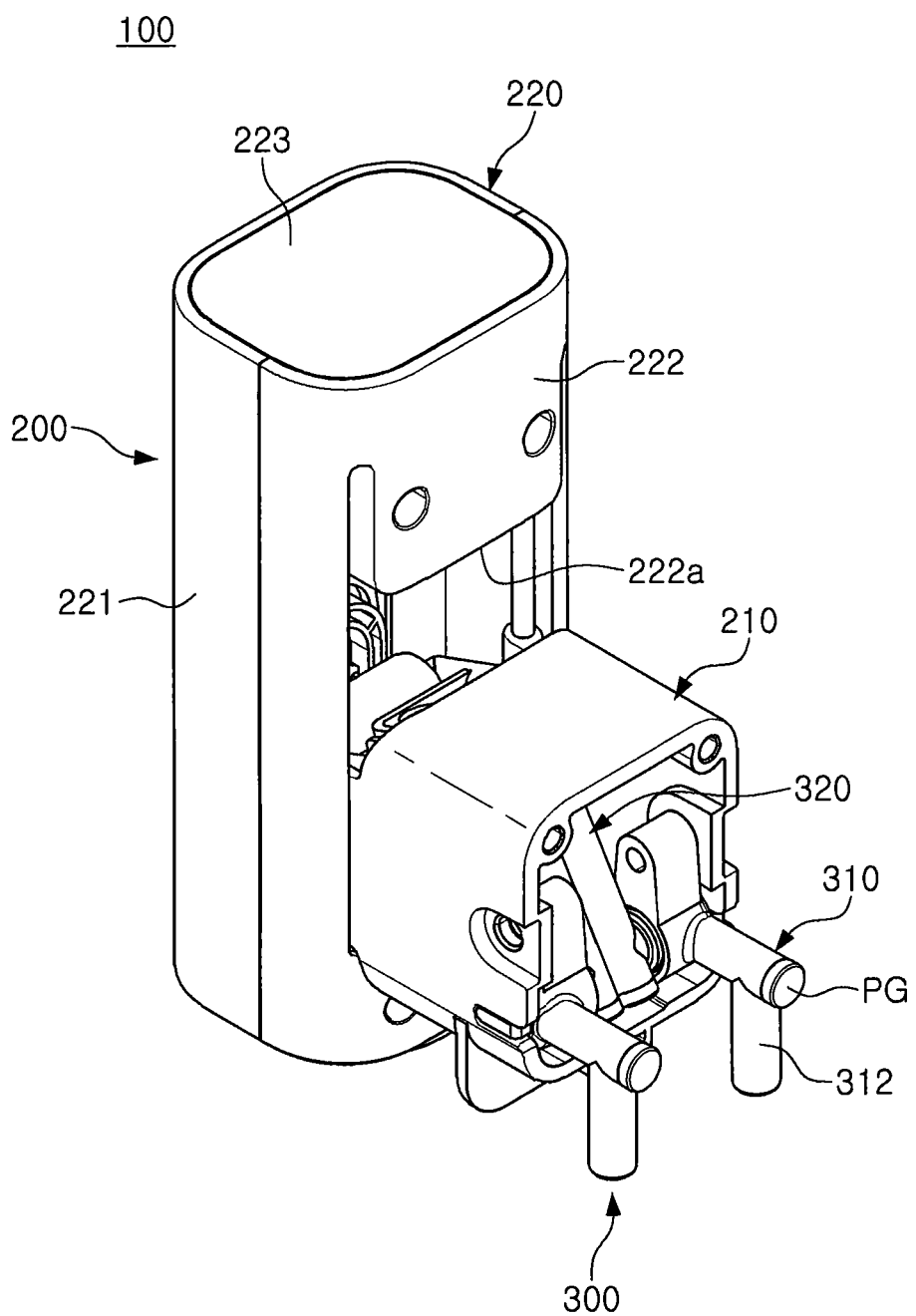
FIG. 2 is a perspective diagram illustrating a rear side of a water discharge device according to an example embodiment in the present disclosure.

FIG. 1 is a perspective diagram illustrating a front side of a water discharge device according to an example embodiment. FIG. 2 is a perspective diagram illustrating a rear side of a water discharge device according to an example embodiment.

Figure 3:
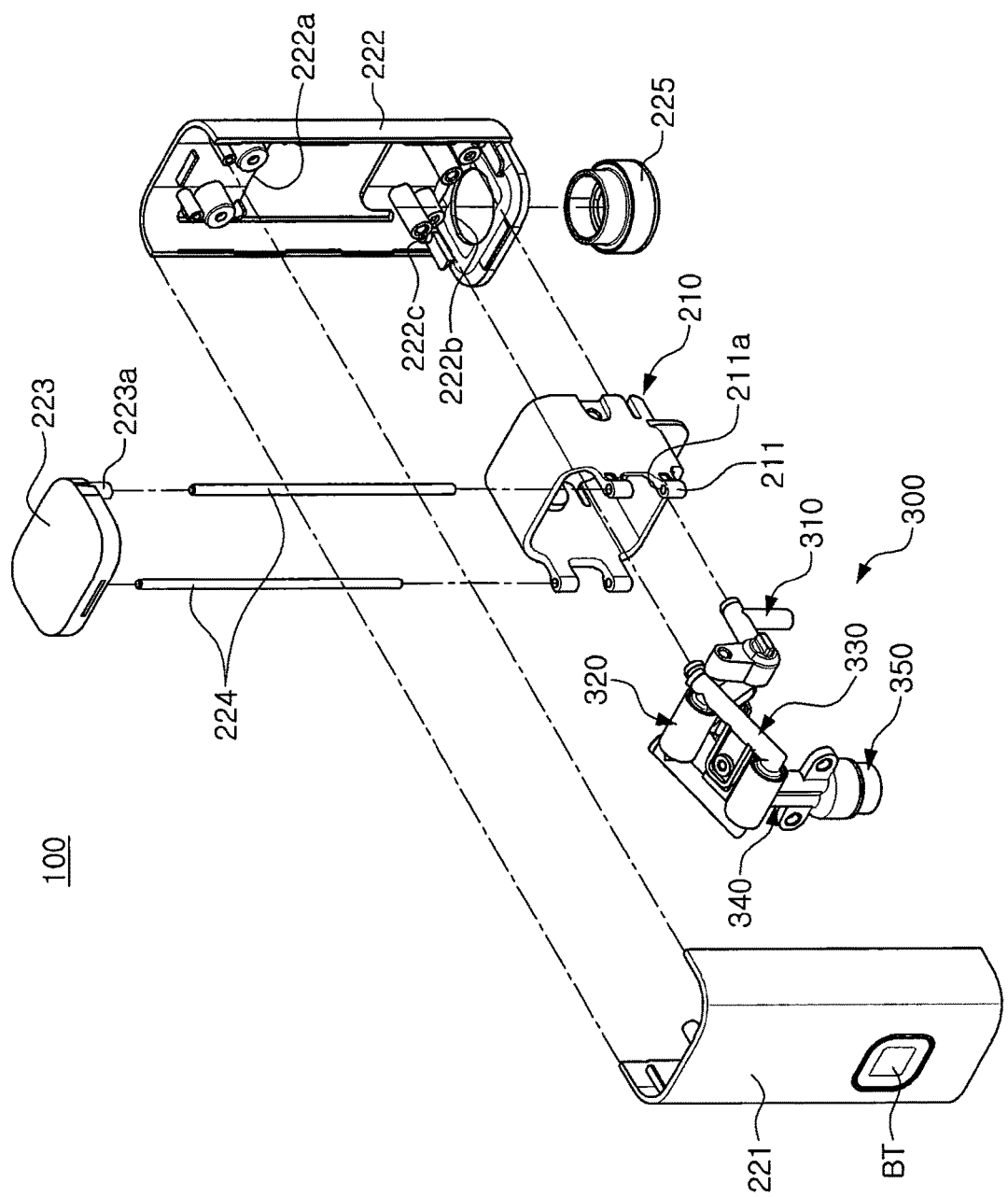
FIG. 3 is a perspective diagram illustrating a water discharge device in a state in which a body unit of the water discharge device is dissembled according to an example embodiment in the present disclosure.
Figure 4:
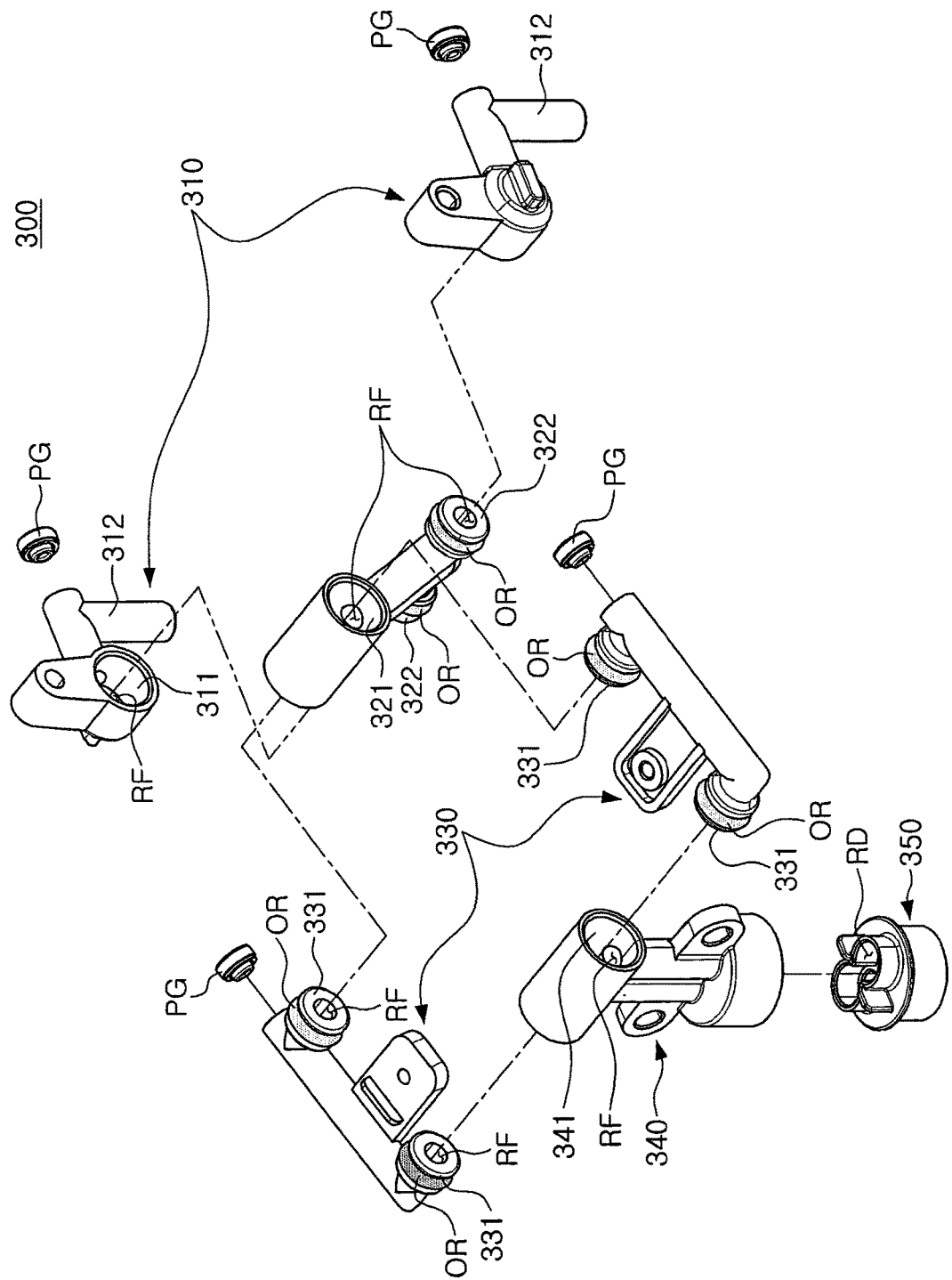
FIG. 4 is an exploded perspective diagram illustrating a discharge unit of a water discharge device according to an example embodiment in the present disclosure.
Figure 5:
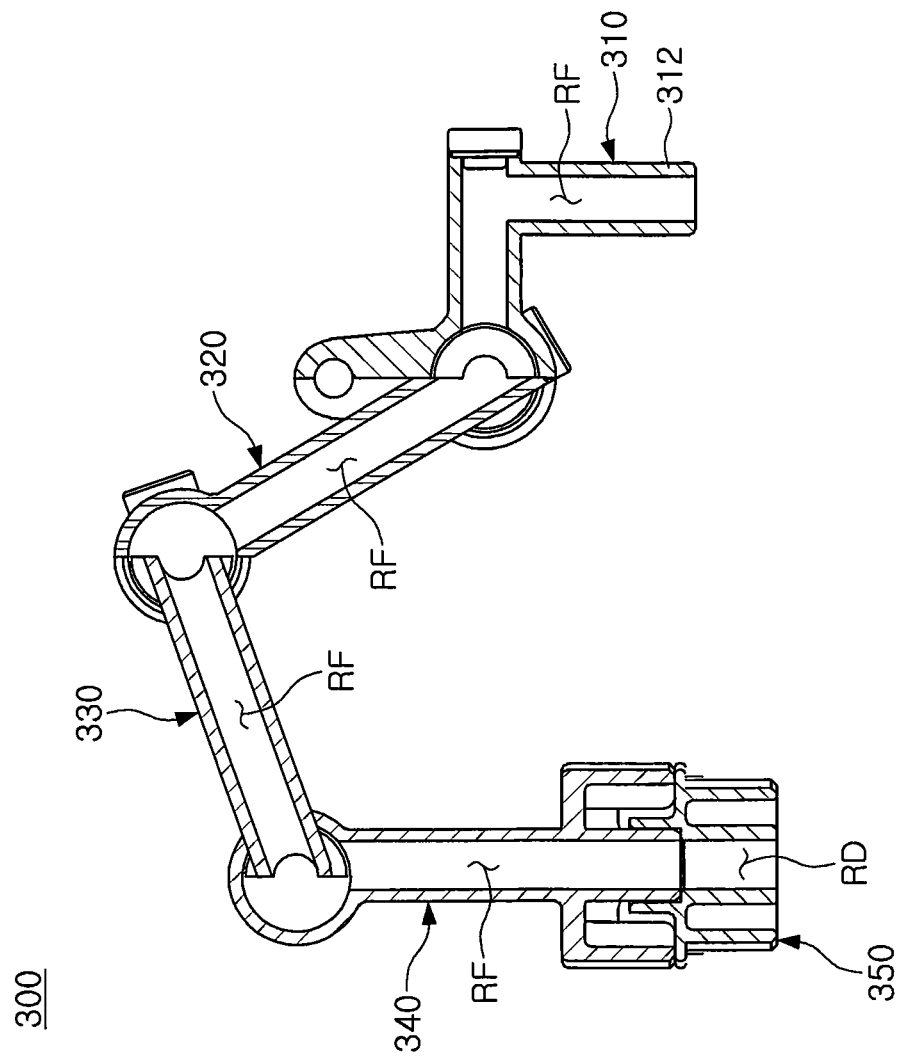
FIG. 5 is a cross-sectional diagram illustrating a flow channel and a discharge channel of a discharge unit of a water discharge device according to an example embodiment in the present disclosure.

FIG. 3 is a perspective diagram illustrating a water discharge device in a state in which a body unit of the water discharge device is dissembled according to an example embodiment. FIG. 4 is an exploded perspective diagram illustrating a discharge unit of a water discharge device according to an example embodiment. FIG. 5 is a cross-sectional diagram illustrating a flow channel and a discharge channel of a discharge unit of a water discharge device according to an example embodiment.

Figure 6:
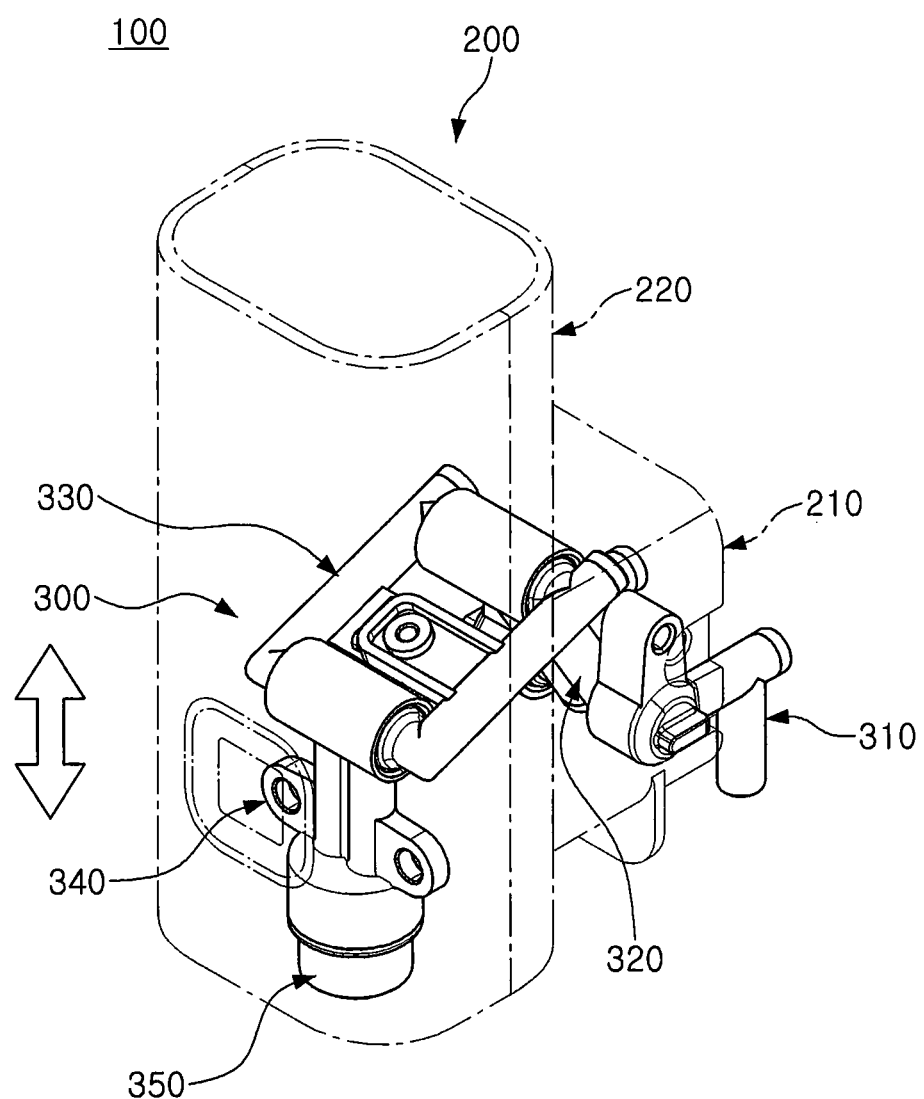
FIGS. 6 to 8 are diagrams illustrating an operation of a water discharge device according to an example embodiment in the present disclosure.
Figure 7:
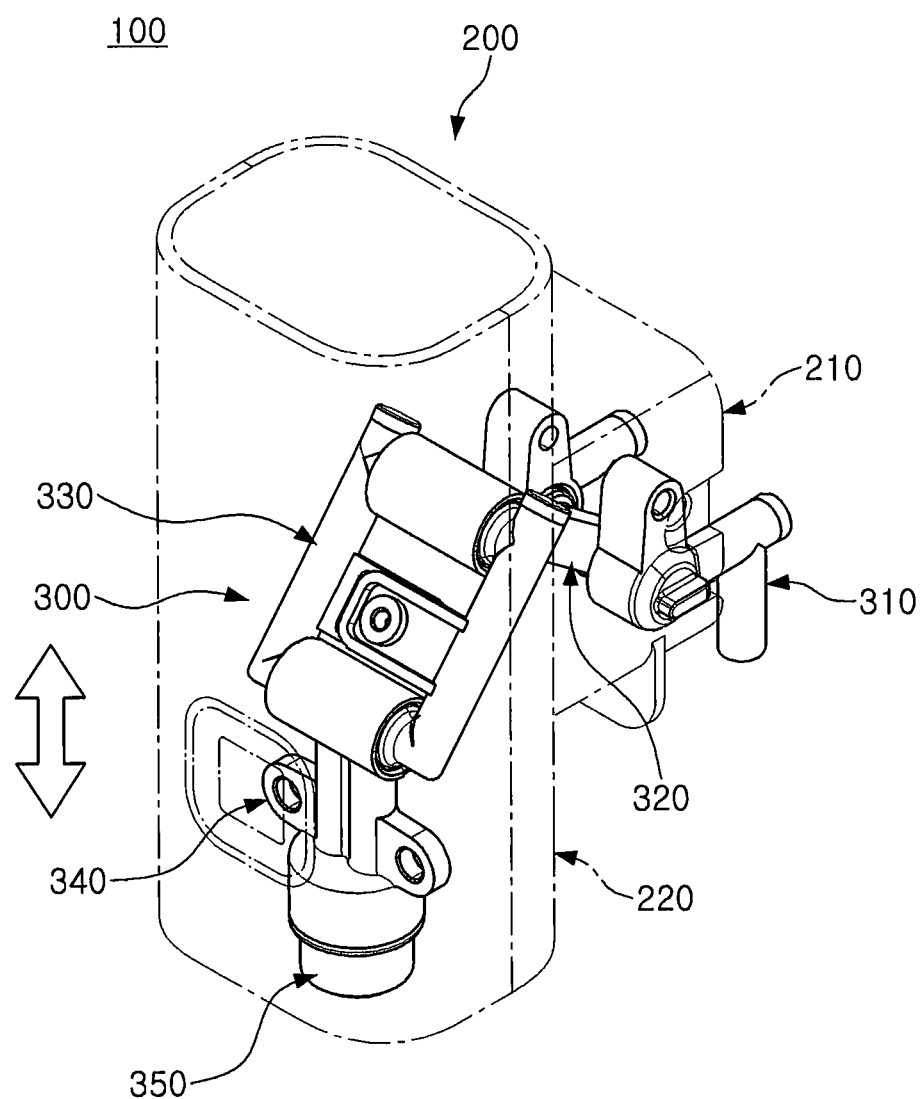
Figure 8:
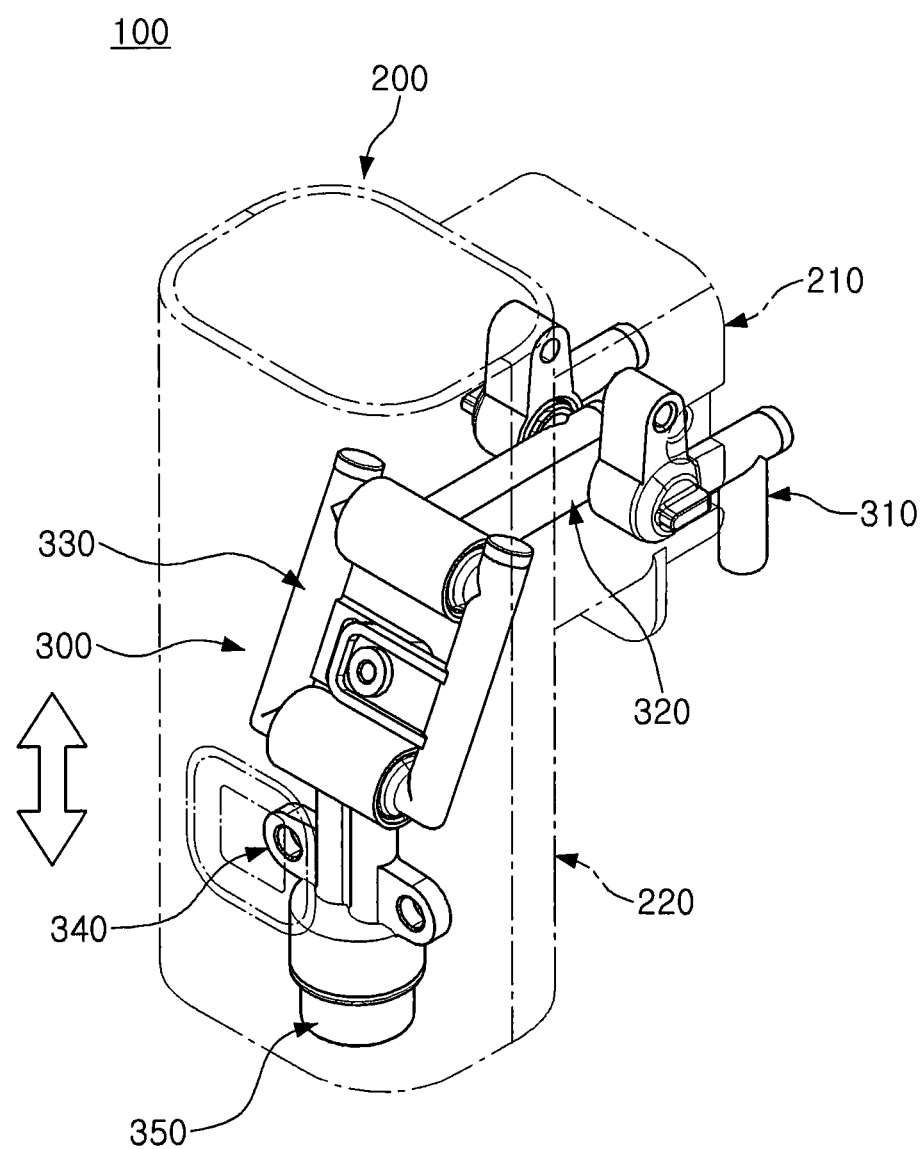

FIGS. 6 to 8 are diagrams illustrating an operation of a water discharge device according to an example embodiment.

An example embodiment of a water discharge device 100 may include a body unit 200 and a discharge unit 300.

The body unit 200 may include a first body 210 and a second body 220.

The first body 210 may be connected to a device body (not illustrated) of a water supply source (not illustrated). The water supply source may be implemented as a water treatment device (not illustrated), such as a water purifier, or the like, for example. The first body 210 may be connected to the device body included in the water treatment device using a bolt, or the like. Accordingly, the first body 210 may be fixed to the device body of the water treatment device.

The water supply source is not limited to any particular example, and may be implemented by any device which may supply water. The configuration in which the first body 210 is connected the device body of the water supply source, a device body of a water treatment device, for example, is not limited to any particular example, and any configuration in which the first body 210 may be connected to the device body may be used.

A member through hole 211a may be formed in the first body 210 as illustrated in FIG. 3. For example, a plurality of hole forming portions 211 configured to extend from the first body 210 by a certain length may be formed in the first body 210, and the member through hole 211a may be formed in each of the plurality of hole forming portions 211. The configuration in which the member through hole 211a is formed in the first body 210, however, is not limited to any particular example, and may be implemented by any well-known configuration.

A moving guide member 224 provided in the second body 220 may penetrate through the member through hole 211a. To this end, a portion of a side of the member through hole 211a of the first body 210, the hole forming portion 211 of the first body 210, for example, may pass through a moving guide hole 222a formed in the second body 220 and may be disposed in the second body 220.

Accordingly, the second body 220 may be moveably connected to the first body 210. However, the configuration in which the second body 220 may be movably connected to the first body 210 is not limited to any particular example, and any configuration in which the second body 220 may be movably connected to the first body 210 may be used.

A body through hole 212 may be formed in the first body 210. The discharge unit 300 connected to the second body 220 may penetrate through the body through hole 212 and may be connected to the water supply source. Accordingly, even when the second body 220 moves as illustrated in FIGS. 6 and 8, moving up and down, for example, the discharge unit 300 may be continuously connected to the water supply source. Also, water from the water supply source may be externally discharged through the discharge unit 300 regardless of a moving position of the second body 220.

The second body 220 may be movably connected to the first body 210.

As illustrated in FIG. 3, the moving guide member 224 may be provided in the second body 220. For example, member connecting holes 222c and 223a may be formed in the second body 220, and one side and the other side of the moving guide member 224 may be inserted and connected to the member connecting holes 222c and 223a, respectively, thereby providing the moving guide member 224 in the second body 220. Also, the moving guide hole 222a may be formed in the second body 220. A portion of a side of the member through hole 211a of the first body 210, the hole forming portion 211, for example, may pass through the moving guide hole 222a and may be disposed in the second body 220. In this state, the moving guide member 224 may penetrate through the member through hole 211a of the first body 210. Accordingly, the second body 220 may be movably connected to the first body 210.

In the configuration described above, movement of the second body 220 may be guided by the moving guide member 224 and the moving guide hole 222a. Also, a moving distance of the second body 220 may be varied in accordance with a length of the moving guide hole 222a.

The configuration in which the second body 220 may be movably connected to the first body 210, however, is not limited to any particular example, and any well-known configuration in which the second body 220 may be movably connected to the first body 210 may be used.

An insertion connection hole 222b may be formed in the second body 220. A portion of a discharge member 350 included in the discharge unit 300 may be inserted and connected to the insertion connection hole 222b such that the portion of the discharge member 350 may be externally exposed. Accordingly, the discharge unit 300 may be connected to the second body 220 and may move along with the second body 220 when the second body 220 moves.

The second body 220 may include a front side forming member 221, a rear side lower side forming member 222, and an upper side forming member 223. The front side forming member 221 may form a front side of the second body 220. The rear side lower side forming member 222 may form a rear side and a lower side of the second body 220. By connecting the front side forming member 221 to the rear side lower side forming member 222, a lateral side of the second body 220 may be formed. Also, by connecting the upper side forming member 223 to the front side forming member 221 and the rear side lower side forming member 222, an upper side of the second body 220 may be formed.

A button BT for discharging water supplied from the water supply source from the discharge unit 300 externally may be provided in the front side forming member 221. The moving guide hole 222a, the insertion connection hole 222b, and the member connection hole 222c may be formed in the rear side lower side forming member 222. The member connecting hole 223a may be formed in the upper side forming member 223.

The configuration of the second body 220, however, is not limited to any particular example, and any configuration in which the second body 220 may be movably connected to the first body 210 and may be connected to the discharge unit 300 may be used.

A discharge guide member 225 may be provided in the second body 220. Water externally discharged from the discharge unit 300 may be guided by the discharge guide member 225. The discharge guide member 225 may be provided in a portion of the rear side lower side forming member 222 disposed around the insertion connection hole 222b, for example. However, a dispositional position of the discharge guide member 225 is not limited to any particular position, and the discharge guide member 225 may be provided at any position of the second body 220 at which the discharge guide member 225 may guide water externally discharged from the discharge unit 300.

The discharge unit 300 may be connected to the second body 220 of the body unit 200. Accordingly, the discharge unit 300 may move along with the second body 220 when the second body 220 of the body unit 200 moves as illustrated in FIGS. 6 and 8.

The discharge unit 300 may be connected to the water supply source to discharge water from the water supply source externally. For example, the discharge unit 300 may penetrate through the moving guide hole 222a of the second body 220 of the body unit 200 and through the body through hole 212 of the first body 210 and may be connected to the water supply source.

Accordingly, even when the second body 220 of the body unit 200 moves, the discharge unit 300 may be continuously connected to the water supply source. Also, water from the water supply source may be externally discharged through the discharge unit 300 regardless of a moving position of the discharge unit 300 that moves along with the second body 220.

The discharge unit 300 may include a plurality of link members 320, 330, and 340. A flow channel RF in which water moves may be formed in each of the plurality of link members 320, 330, and 340 as illustrated in FIG. 5. The plurality of link members 320, 330, and 340 may be rotatably connected to one another to connect the flow channels RF to one another in a sealed manner.

Accordingly, when the second body 220 of the body unit 200 moves, the discharge unit 300 may move along with the second body 220, and water from the water supply source may flow in the flow channel RF of the discharge unit 300 and may be discharged externally regardless of a moving position of the discharge unit 300.

As described above, by using the plurality of link members 320, 330, and 340, rather than using a flexible tube, the discharge unit 300 may move along with the second body 220 of the body unit 200, and water from the water supply source may be discharged externally through the discharge unit 300. Accordingly, the water discharge device 100 may be able to move in a relatively small space.

Also, as each of the plurality of link members 320, 330, and 340 does not have a curved portion, such as a curved portion of a flexible tube, foreign objects may not remain in the link members. Accordingly, hygiene of the water discharge device 100 may improve such that water may be supplied to a user without foreign objects.

Also, even when the plurality of link members 320, 330, and 340 are used for a long time, the plurality of link members 320, 330, and 340 may not be deformed or broken. Accordingly, water from the water supply source may be smoothly discharged externally through the water discharge device 100.

As illustrated in FIGS. 3 and 4, the plurality of link members 320, 330, and 340 may include the first link member 320, the second link member 330, and the third link member 340. The number of the plurality of link members 320, 330, and 340, however, is not limited to any particular number. The number of the plurality of link members 320, 330, and 340 may be two or more.

The first link member 320 may be rotatably connected to a supply source connection member 310 included in the discharge unit 300. The second link member 330 may be rotatably connected to the first link member 320. The third link member 340 may be rotatably connected to the second link member 330.

The discharge unit 300 may further include the supply source connection member 310. The flow channel RF may also be formed in the supply source connection member 310. The supply source connection member 310 may be connected to the water supply source. For example, the flow channel RF may be configured to extend in the supply source connection member 310 and a connection port 312 connected to a connection pipe (not illustrated) or directly connected to the water supply source may be formed in the supply source connection member 310. Accordingly, water from the water supply source may flow into the flow channel RF of the supply source connection member 310 through the connection port 312 and may flow in the flow channel RF of the supply source connection member 310.

The link member 320 of the plurality of link members 320, 330, and 340 disposed on one side, the first link member 320, for example, may be rotatably connected to the supply source connection member 310.

First rotary connection portions 311, 321, and 341 may be disposed in the supply source connection member 310 and the partial link members 320 and 340 of the plurality of link members 320, 330, and 340, respectively. For example, as illustrated in FIG. 3, the first rotary connection portions 311, 321, and 341 may be disposed in the supply source connection member 310, the first link member 320, and the third link member 340, respectively.

Second rotary connection portions 322 and 331 rotatably connected to the first rotary connection portions 311, 321, and 341 may be disposed in the partial link members 320 and 330 of the plurality of link members 320, 330, and 340. For example, as illustrated in FIG. 3, the second rotary connection portions 322 and 331 may be disposed in the first link member 320 and the second link member 330, respectively. In this case, only the second rotary connection portion 331 may be disposed in the second link member 330.

The flow channels RF of the supply source connection member 310 and the plurality of link members 320, 330, and 340 may be configured to extend to the first rotary connection portions 311, 321, and 341 and the second rotary connection portions 322 and 331 of the supply source connection member 310 and the plurality of link members 320, 330, and 340.

Also, a sealing member OR may be provided in each of the second rotary connection portions 322 and 331, and when the second rotary connection portions 322 and 331 are inserted into the first rotary connection portions 311, 321, and 341, a region between the second rotary connection portions 322 and 331 and the first rotary connection portions 311, 321, and 341 may be sealed by the sealing member OR.

By the configuration described above, the supply source connection member 310 may be rotatably connected to the plurality of link members 320, 330, and 340, the first to third link members 320, 330, and 340, for example, to connect the flow channels RF to one another in a sealed manner. The configuration in which the supply source connection member 310 may be rotatably connected to the plurality of link members 320, 330, and 340 to connect the flow channels RF to one another in a sealed manner is not limited to any particular example, and any well-known configuration may be used.

The discharge unit 300 may further include the discharge member 350. The discharge member 350 may be connected to the link member 340 of the plurality of link members 320, 330, and 340 disposed on the other side, and to the second body 220 of the body unit 200.

For example, the discharge member 350 may be inserted and connected to the third link member 340. Also, the discharge member 350 may be inserted and connected to the insertion connection hole 222b of the second body 220 of the body unit 200 such that the discharge member 350 may be connected to the second body 220 of the body unit 200. The configuration in which the discharge member 350 may be connected to the third link member 340 of the plurality of link members 320, 330, and 340 disposed on the other side and the configuration in which the discharge member 350 may be connected to the second body 220 of the body unit 200, however, may not be limited to any particular examples, and any well-known configurations may be used.

A discharge channel RD may be formed in the discharge member 350. The discharge channel RD may be connected to the flow channel RF of the link member 340 of the plurality of link members 320, 330, and 340 disposed on the other side, the third link member 340, for example, and to an external entity. Accordingly, water flowing into the flow channel RF of the supply source connection member 310 through the connection port 312 of the supply source connection member 310 from the water supply source may flow in the flow channels RF of the plurality of link members 320, 330, and 340 and may be externally discharged through the discharge channel RD of the discharge member 350.

An open portion of the flow channel RF of each of the supply source connection member 310 and the plurality of link members 320, 330, and 340 may be blocked by a plug member PG.

When the water discharge device described in the aforementioned example embodiment is used, by using the plurality of link members, rather than using a flexible tube, the water discharge device may be able to move and may discharge water from the water supply source externally, the water discharge device may be able to move in a relatively small space, hygiene of the water discharge device may improve such that water may be supplied to a user without foreign objects, and water from the water supply source may be smoothly discharged through the water discharge device.

The water discharge device described above is not limited to the features described in the example embodiments set forth herein, but overall or some of the example embodiments may be selectively combined and configured to implement a variety of modifications.

The invention claimed is:
1. A water discharge device, comprising:
a second body movable in a first direction with respect to a device body and fixed in a second direction perpendicular to the first direction; and
a discharge unit having an end connected to a water supply source of the device body, with the other end fixed to the second body, and configured to discharge water through the other end,
wherein the discharge unit includes a plurality of link members having flow channels through which water flows, respectively, and rotatably connected to one another to connect the flow channels to one another in a sealed manner, wherein the plurality of link members includes a first link member, a second link member, and a third link member, wherein the first link member has a first rotary connection portion rotatably connected to the water supply source formed at one end and a second rotary connection portion formed at the other end, wherein the second link member has a third rotary connection portion rotatably connected to the second rotary connection portion of the first link member formed at one end and a fourth rotary connection portion formed at the other end, wherein the third link member having a fifth rotary connection portion rotatably connected to the fourth rotary connection portion of the second link member formed at one end and a discharge member is formed at the other end, and wherein the discharge member is fixed to the second body and moves in conjunction with the movement of the second body in the first direction, while facing in the same direction, so that the discharge member moves in the first direction while being fixed in the second direction with respect to the device body.

2. The water discharge device of claim 1, wherein the discharge unit further includes a supply source connection member having the flow channel and connected to the water supply source, and a link member of the plurality of link members disposed on one side is rotatably connected to the supply source connection member.

3. The water discharge device of claim 2,
wherein each of the supply source connection member and partial link members of the plurality of link members includes the first rotary connection portion, wherein each of partial link members of the plurality of link members includes the second rotary connection portion rotatably connected to the first rotary connection portion, and wherein the flow channel is configured to extend to the first rotary connection portion and the second rotary connection portion.

4. The water discharge device of claim 3, wherein the second rotary connection portion is inserted into and rotatably connected to the first rotary connection portion.

5. The water discharge device of claim 4, wherein the second rotary connection portion includes a sealing member for sealing a region between the first rotary connection portion and the second rotary connection portion.

6. The water discharge device of claim 3, wherein the plurality of link members includes the first link member rotatably connected to the supply source connection member, the second link member rotatably connected to the first link member, and the third link member rotatably connected to the second link member.

7. The water discharge device of claim 6,
wherein each of the supply source connection member, the first link member, and the third link member includes the first rotary connection portion, and wherein each of the first link member and the second link member includes the second rotary connection portion.

8. The water discharge device of claim 2, further comprising:
the discharge member connected to a link member of the plurality of link members disposed on the other side and to the second body, and including a discharge channel connected to the flow channel of the link member disposed on the other side and to an external entity.

9. The water discharge device of claim 1,
further comprising a first body including a member through hole, and wherein the second body includes a moving guide member configured to penetrate the member through hole.

10. The water discharge device of claim 9,
wherein the second body includes a moving guide hole, and wherein a portion of the first body disposed on a side of the member through hole passes through the moving guide hole and is disposed in the second body.

11. The water discharge device of claim 10, wherein the discharge unit penetrates through the moving guide hole and a body through hole formed in the first body, and is connected to the water supply source.

12. The water discharge device of claim 8, wherein the second body includes an insertion connection hole to which a portion of the discharge member is inserted and connected such that the portion of the discharge member is externally exposed.

* * * * *